United States Patent [19]

Stradling et al.

[11] 4,266,643

[45] May 12, 1981

[54] REVERSING TRANSMISSION

[75] Inventors: John H. Stradling, Jeffersonville; Paul R. Albrecht, Lansdale, both of Pa.

[73] Assignee: J. H. Stradling, Inc., Bridgeport, Pa.

[21] Appl. No.: 22,471

[22] Filed: Mar. 20, 1979

[51] Int. Cl.³ ............................................. F16D 11/06
[52] U.S. Cl. .................................. 192/51; 192/87.13; 474/4
[58] Field of Search ...................... 192/48.9, 51, 87.13; 74/220

[56] References Cited

U.S. PATENT DOCUMENTS

| 1,978,355 | 10/1934 | Rundlett | 74/220 X |
| 2,542,351 | 2/1951 | Pease | 74/220 X |
| 2,809,530 | 10/1957 | Wilson | 74/220 |

Primary Examiner—Kenneth Downey

Attorney, Agent, or Firm—Joseph W. Molasky & Associates

[57] ABSTRACT

A reversing transmission is comprised of a rotating input shaft, an output shaft rotatable in either direction, first and second rotating clutches, means operatively connected between the input shaft and the first and second clutches for causing rotation of an input drive portion thereof, first drive means responsive to engagement of the first clutch to cause rotation of the output shaft in one direction, second drive means responsive to engagement of the second clutch to cause rotation of the output shaft in the other direction, and control means responsive to a first operating condition for causing engagement of the first clutch and disengagement of the second clutch and responsive to a second operating condition for causing engagement of the second clutch and disengagement of the first clutch.

4 Claims, 5 Drawing Figures

REVERSING TRANSMISSION

BACKGROUND AND SUMMARY OF THE INVENTION

This invention relates generally to reversing transmissions. More particularly, the invention relates to a reversing transmission of a type suited for applications such as the driving of a traverse shaft of a lapper.

The reversing transmission of the invention is an improvement over the prior art devices of the indicated type in several respects. Firstly, the design is such that smooth reversals can be achieved by reason of the use of pneumatically actuated clutches wherein controlled acceleration and deceleration rates are possible. Secondly, the simple pneumatic design requires no adjustment and only an initial setting of the air pressure. Thirdly, the design can control a lapper so as to maintain constant lap widths since no warm up periods are necessary as is the case with many prior art devices that use oil baths.

Briefly stated, the reversing transmission of the invention is comprised of a rotating input shaft, an output shaft rotatable in either direction about its axis, first and second rotating clutch means, means operatively connected between the input shaft and the first and second clutch means for causing rotation of an input drive member thereof, first drive means responsive to engagement of said first clutch means to cause rotation of said output shaft in one direction, second drive means responsive to engagement of said second clutch means to cause rotation of said output shaft in the other direction, and control means responsive to a first operating condition for causing engagement of the first clutch means and disengagement of the second clutch means and responsive to a second operating condition for causing engagement of the second clutch means and disengagement of the first clutch means.

DETAILED DESCRIPTION OF THE PREFERRED EMBODIMENT

While the reversing transmission shown in FIGS. 1-5 is designed for use as a pneumatic lapper shifter, it will be apparent that the invention has broader application.

A lapper is a device that receives a web of batting material from a carding machine and delivers the web onto a conveyor to form layers thereof by means of a traverse apron assembly that moves back and forth across the conveyor. Typically, the traverse apron assembly reverses its traverse movement over the conveyor about every 5-10 seconds and is driven from a rotating lapper traverse shaft. It is this traverse shaft which is driven by the reversing transmission in accordance with the invention shown in FIGS. 1-5. The reversing transmission of the invention is controlled to reverse the drive direction of the traverse shaft of the lapper at precisely the time whereat the traverse apron assembly changes its direction of traverse across the conveyor.

Figure 1:
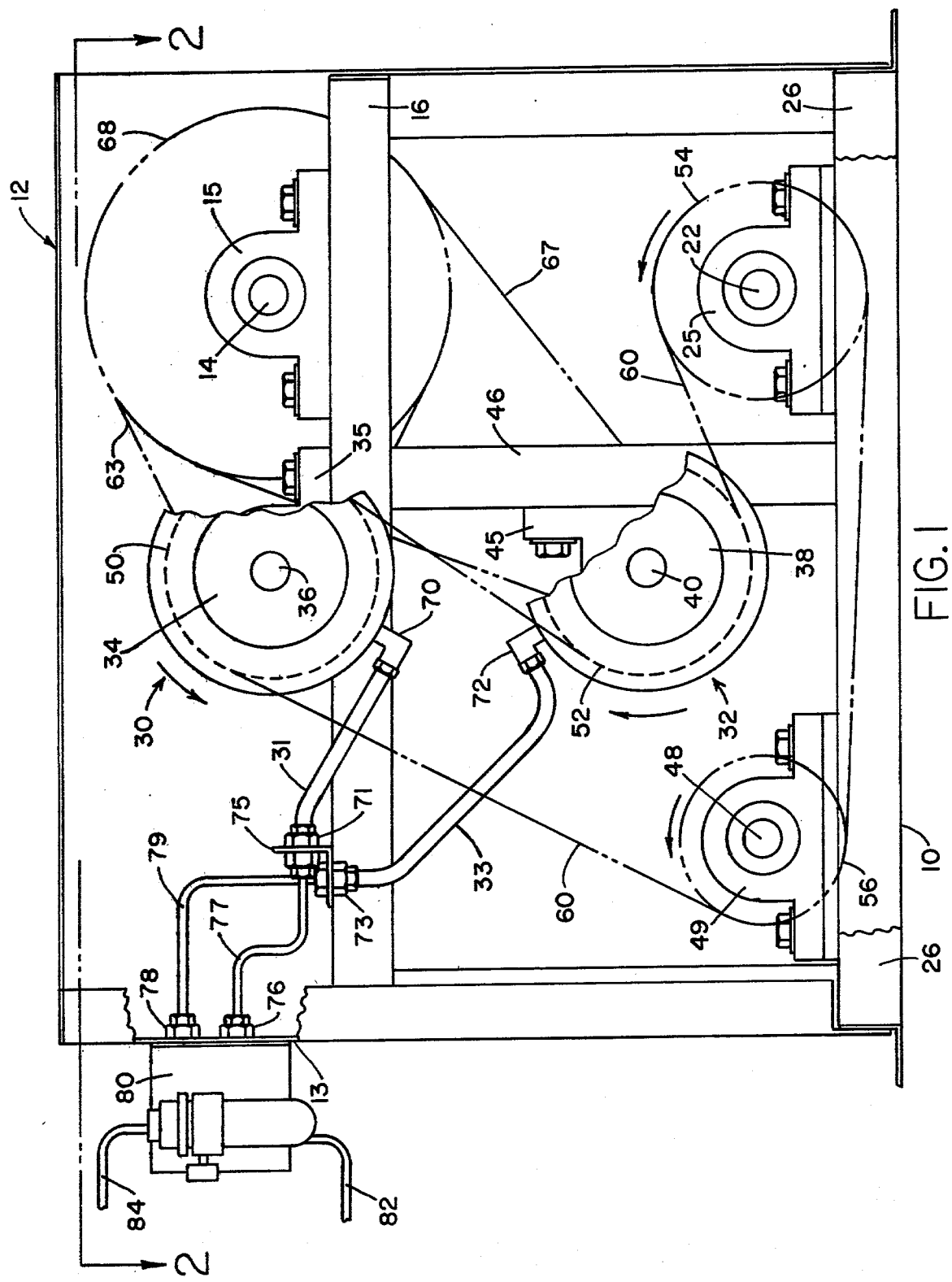
FIG. 1 is a sectional view of the reversing transmission of the invention with various parts broken away and others omitted for the sake of clarity of illustration.
Figure 2:
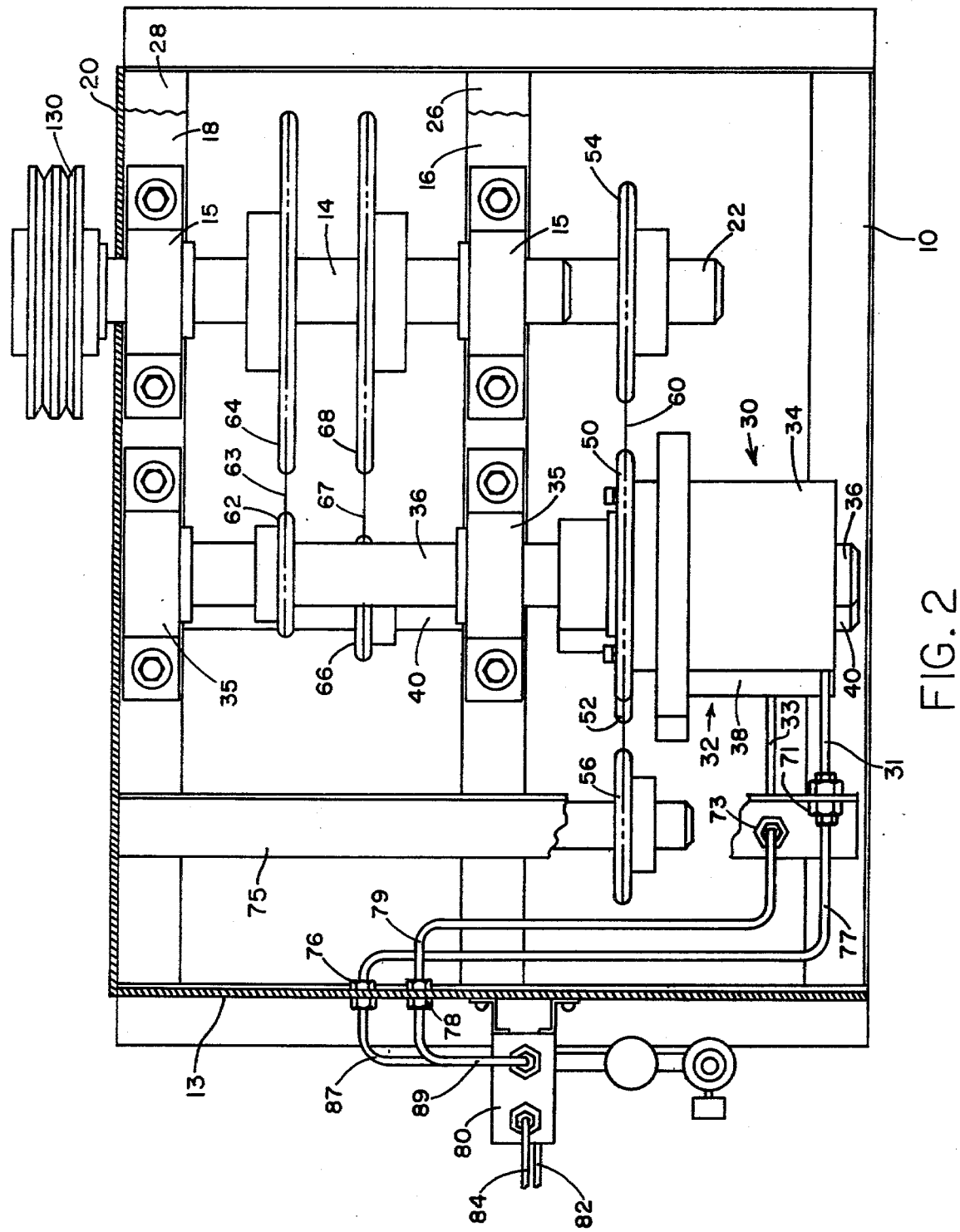
FIG. 2 is a view taken generally on line 2—2 of FIG. 1.

Referring to FIGS. 1 and 2, the reversing transmission of the invention comprises a frame 10 for supporting the various operating elements of the device and a housing 12 for enclosing such elements. The reversing transmission comprises an output shaft 14 mounted for rotation in a pair of spaced apart pillow block bearings 15 one of which is supported on a horizontal frame member 16 and the other of which is supported on a horizontal frame member 18. Frame member 16 is located centrally within housing 12 at an elevated position and frame member 18 is located adjacent the rear wall plate 20 of housing 12 at an elevated position.

The reversing transmission comprises an input shaft 22 mounted for rotation in a pair of spaced apart pillow block bearings 25 one of which is mounted on a horizontal frame member 26 and the other of which is mounted on a horizontal frame member 28. Frame member 26 is located below and aligned with frame member 16 and frame member 28 is located below and aligned with frame member 18 as is apparent from a consideration of FIGS. 1 and 2. The output shaft 14 and the input shaft 22 extend horizontally one above the other and are in a parallel aligned relationship as is apparent from a consideration of FIGS. 1 and 2.

Mounted within housing 12 adjacent the output shaft 14 and the input shaft 22 are an upper clutch means 30 and a lower clutch means 32. Clutch means 30 comprises a pneumatically actuated rotary clutch 34 mounted on a shaft 36 and clutch means 32 comprises a pneumatically actuated rotary clutch 38 mounted on a shaft 40. Clutches 34 and 38 are of a conventional type such as the air clutch manufactured by Horton Manufacturing Company. This type of pneumatic clutch is actuated into an engaged position in response to the application of static air pressure thereto and is actuated into a disengaged position by means of a return spring once the air pressure is removed. The pneumatic clutch includes a friction disc mounted for axial movement along a spline and moveable into an engaged position when static air pressure is supplied to a piston-air chamber, the friction disc moving into frictional engagement with a drive disc when the clutch is actuated to its engaged position. The friction disc is keyed to a hub which is mounted on the shaft supporting the clutch and is keyed to this supporting shaft in a conventional mounting arrangement. Thus, the hub of clutch 34 is keyed to shaft 36 and the hub of clutch 38 is keyed to shaft 40.

The shaft 36 of clutch means 30 is rotatably mounted on a pair of spaced apart pillow block bearings 35 mounted on frame members 16 and 18 adjacent bearings 15 as is apparent from FIG. 2. In this manner, shaft 36 is mounted to extend parallel to input shaft 22 and output shaft 14. Shaft 40 is rotatably mounted in a pair of pillow block bearings 45 mounted on vertically extending frame members 46 one of which extends between frame members 16 and 26 and the other of which extends between frame members 18 and 28. In this manner shaft 40 is mounted to extend parallel to input shaft 22 and output shaft 14.

An idler shaft 48 is rotatably mounted in a pair of spaced apart pillow block bearings 49 mounted on frame members 26 and 28 adjacent clutch means 32. Idler shaft 48 is mounted to extend parallel to clutch means shafts 36 and 40 for a purpose to be described hereafter.

Clutch means 30 includes an input drive means in the form of a clutch sprocket 50 drivingly mounted on the drive disc of clutch 32 for conjoint rotation therewith. Clutch means 32 includes an input drive means in the form of a clutch sprocket 52 drivingly mounted on the drive disc of clutch 38 for conjoint rotation therewith. The clutch sprockets 50 and 52 are mounted to be aligned relative to one another vertically as is shown in FIG. 2.

There is provided a drive means providing an operative connection between input shaft 22 and the input drive means of clutch means 30 and 32. To this end, a sprocket 54 is mounted on input shaft 22 for rotation therewith and in a position aligned with clutch sprockets 50 and 52 and a sprocket 56 is mounted on idler shaft 48 for rotation therewith and in a position aligned with sprockets 50, 52 and 54. A roller chain 60 is mounted to be engaged with sprockets 50, 52, 56 and 54 at peripheral portions thereof in a manner so that the chain 60 causes rotation of these sprockets in the directions shown by the arrows in FIG. 1. By this arrangement, the counterclockwise rotation of input shaft 22 drives chain 60 through sprocket 54 to cause a clockwise rotation of clutch sprocket 52 and a counterclockwise rotation of clutch sprocket 50. It is to be noted that at all times when input shaft 14 is rotating, the clutch sprockets 50 and 52 will be rotated in the direction shown in FIG. 1 regardless of whether or not their associated clutches 34 and 38 are engaged. However, when one of the clutches 34 or 38 is engaged, their associated clutch shaft 36 or 40 will be rotated along with the clutch sprocket 50 or 52.

There is provided a first driven means responsive to the actuation of clutch means 30 into its engaged position for causing output shaft 14 to rotate in one direction about its axis. To this end, a sprocket 62 is mounted on shaft 36 for rotation therewith and in alignment with a sprocket 64 mounted on output shaft 14 for rotation therewith. A roller chain 63 is mounted to engage peripheral portions of the aligned sprockets 62 and 64 for causing the transmission of rotation therebetween. Thus, as viewed in FIG. 1 the counterclockwise rotation of shaft 36 causes a corresponding counterclockwise rotation of output shaft 14. It will be apparent that the shaft 36 will be driven in a counterclockwise direction when the clutch means 30 is actuated to its engaged position since shaft 36 will be driven in the same direction that sprocket 50 is driven when the clutch 34 is actuated into its engaged position.

There is provided a second driven means responsive to the actuation of clutch means 32 into its engaged position for causing output shaft 14 to rotate in the other direction about its axis. To this end, a sprocket 66 is mounted on shaft 40 for rotation therewith and in alignment with a sprocket 68 mounted on output shaft 14 for rotation therewith. A roller chain 67 is mounted in engagement with peripheral portions of the aligned sprockets 66 and 68 for causing the transmission of rotation therebetween. Thus, as viewed in FIG. 1, the clockwise rotation of shaft 40 causes a corresponding clockwise rotation of output shaft 14. Shaft 40 will be driven in a clockwise direction when the clutch means 32 is actuated into its engaged position since shaft 40 will be driven in the same direction as sprocket 52 when clutch 38 is actuated into its engaged position.

Clutch means 30 includes a hose assembly 31 communicating, through a valve 70, with the piston-air chamber of clutch 34 for actuating the same into its engaged position. Clutch means 32 includes a hose assembly 33 communicating, through a valve 72, with the piston-air chamber of clutch 38 to supply air thereto for actuating clutch 38 into its engaged position. Hose assemblies 31 and 33 have their inlet ends secured to fittings 71 and 73, respectively, mounted on a frame member 75. Fitting 71 is connected through a line 77 to a fitting 76 mounted on the side plate 13 of housing 12. Fitting 73 is connected through a line 79 to a fitting 78 on side plate 13.

There is provided a control means which is responsive to a first operating condition for causing actuation of clutch means 30 to its engaged position and clutch means 32 to its disengaged position and which is responsive to a second operating condition for causing actuation of clutch means 32 to its engaged position and clutch means 30 to its disengaged position. In the illustrated embodiment of the invention, the first and second operating conditions correspond to the travel limits of the traverse movement of the lapper traverse apron assembly. It will be apparent, of course, that variousoperating conditions may be used as inputs to the control means.

Figure 4:
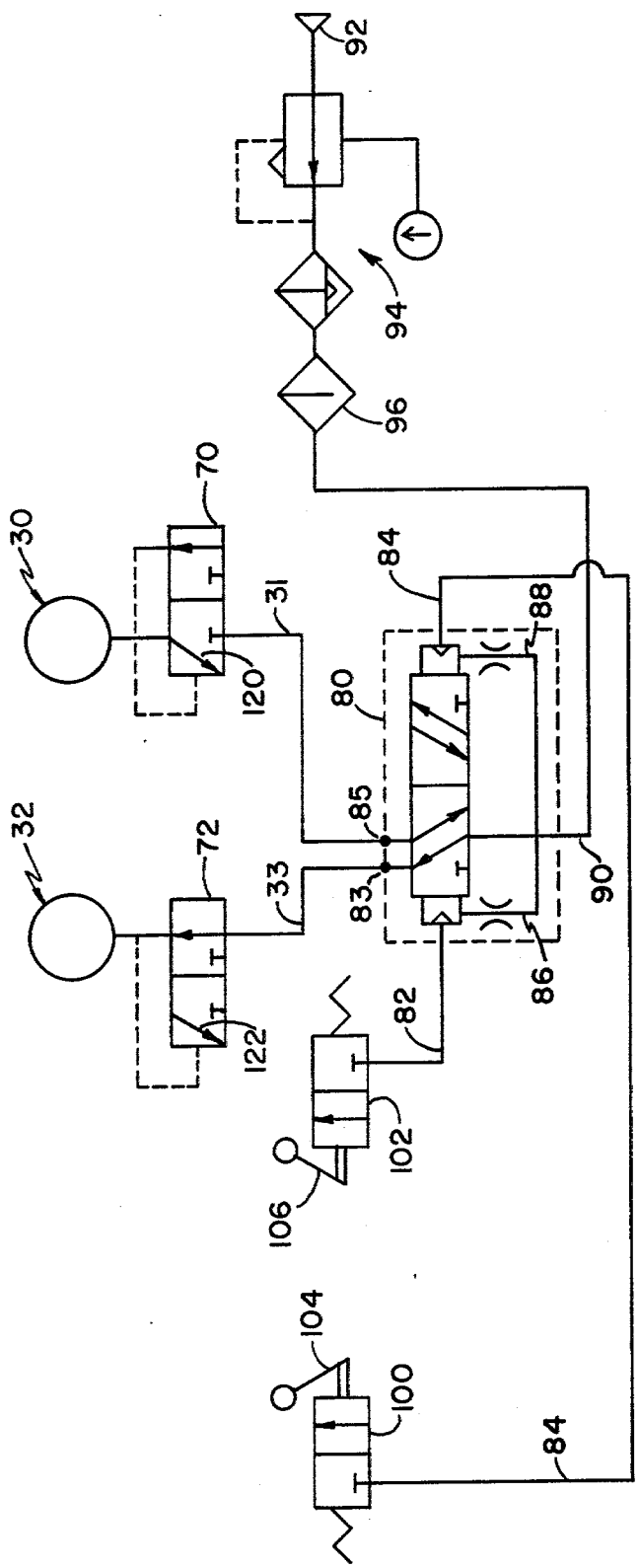
FIG. 4 is a pneumatic diagram of the pneumatic control means for the reversing transmission shown in FIG. 1.

The elements of the pneumatic control are shown in FIG. 4 and comprise a control valve 80 in the form of a two-position double air bleed pilot valve. Control valves of this type and equivalents thereof are well known in the art. Control valve 80 is mounted on side plate 13 and has a pair of bleed lines 82 and 84 connected to bleed ports thereof and a pair of restricted pilot passages 86 and 88 connected to pilot chambers within control valve 80. Air is supplied under pressure to control valve 80 through an air supply line 90 which supplies air to the valve inlet and pilot passages 86 and 88. Control valve 80 has a piston means that is actuatable between control positions to provide communication between the inlet supply line 90 and either of a pair of outlet ports 83 and 85 which are connected to fittings 76 and 78 through lines 87 and 89, respectively, so as to supply air to either of the lines 77 and 79 controlling operation of the pneumatic clutches 34 and 38, respectively.

The air supplied to the control valve 80 and the clutches 34 and 38 must satisfy certain pressure and quality conditions. Typically, the air will pass from an air supply 92 through a filter-regulator unit 94 and an oiler 96 before it passes to the control valve 80 at the desired operating pressure.

There are provided a pair of limit valves 100 and 102 for sensing the operating conditions for actuating control valve 80 between its two control positions. Limit valves 100 and 102 are provided with roller actuators 104 and 106, respectively, which, when contacted, function to cause the limit valves 100 and 102 to be actuated from a no-flow position to a flow position. In FIG. 4, limit valves 100 and 102 are shown in the no-flow position closing the ends of bleed lines 84 and 82. In the flow position of limit valve 100, bleed line 84 is connected to atmosphere so that air is bled through line 84 from the control valve 80, which causes the control valve 80 to be actuated from the position shown in FIG. 5 to the position shown in FIG. 4. In the flow position of limit valve 102, bleed line 82 is connected to atmosphere so that air can be bled from control valve 80 through line 82 to cause control valve 80 to be actuated from the position shown in FIG. 4 to the position shown in FIG. 5. As soon as an actuator roller 102 or 104 is released from contact with their contact member, the associated limit valve 100 or 102 returns to its no-flow position under the action of a return spring. Limit valves which operate in the above-described manner are well known in the art and are commercially available from several manufacturers, such as Numatics, Inc.

Figure 3:
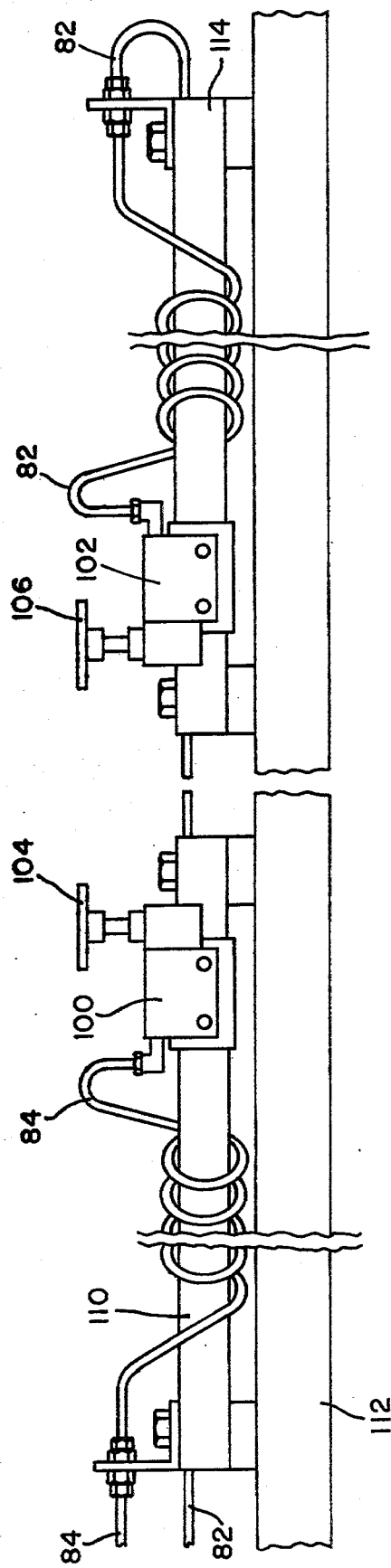
FIG. 3 is an elevational view of the limit valve assembly for the control means of the reversing transmission shown in FIG. 1.

FIG. 3 illustrates the manner in which the limit valves 100 and 102 are mounted in their operating position to sense the traverse movement of the lapper traverse apron assembly. To this end, the limit valve 100 is adjustably mounted on a support member 110 on the lapper frame 112. In like manner, limit valve 102 is adjustably mounted on a support member 114 mounted on lapper frame 112. The limit valves 100 and 102 are set in positions such that their associated actuator rollers 104 and 106 will contact a part of the traverse apron assembly at the limit of its traverse movement in each direction.

The valves 70 and 72 are quick exhaust valves, which are commercially available and whose operation will be described with reference to FIG. 4. In FIG. 4, exhaust valve 72 is shown in the position with air being supplied to the clutch means 32 and exhaust valve 70 is shown in the position to which the valve is actuated when the clutch means 30 is actuated from the engaged position to the disengaged position. As soon as clutch means 30 is actuated to the disengaged position, air can exhaust easily from the clutch 34 into the valve 70 and through the exhaust passage indicated at 120. It will be apparent that some air can also exhaust through lines 31, 77 and 87 to the control valve 80 which also provides for the exhaust of this air. Valve 72 also is provided with an exhaust passage 122 which functions in the same manner as exhaust passage 120 of valve 70 to provide for the quick exhaust of air from the clutch 38 of clutch means 32 when this clutch means is actuated from the engaged position into a disengaged position.

In the use of the reversing transmission of the invention in a lapper shifter, output shaft 14 is connected to drive the lapper traverse shaft by means of a pulley 130 and a v-belt (not shown) engaged on pulley 130. Pulley 130 is a variable pitch two-groove pulley which is adjustable to vary its pitch diameter so as to vary the R.P.M. of the lapper traverse shaft.

Input shaft 22 is driven continuously from the drive unit of the lapper so as to synchronize the traverse speed of the traverse apron assembly with the delivery speed of the material delivered onto the conveyor. Typically, the end of input shaft 22 is coupled to a drive means from the carding machine.

In operation, the lapper traverse shaft causes the traverse apron assembly to move in a direction corresponding to the direction of rotation of output shaft 14. The direction of rotation of output shaft 14 depends on which clutch means is engaged. With the parts in the operating condition shown in FIG. 4, clutch 38 of clutch means 32 is engaged so that output shaft 14 is driven in the clockwise direction as viewed in FIG. 1, which causes the lapper traverse apron assembly to move in the direction toward actuator roller 106 of limit valve 102. Under these conditions, control valve 80 is positioned so that static air pressure is delivered from line 90, through hose assembly 33 to clutch 38 to actuate the same to its engaged position. At this time, clutch 34 is in its disengaged position since no air is applied thereto.

Figure 5:
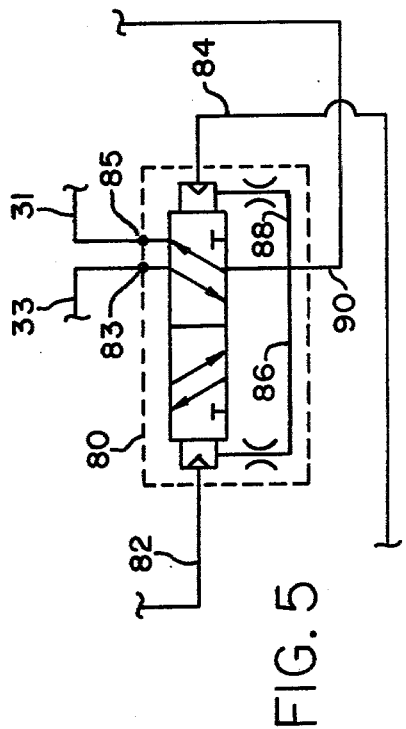
FIG. 5 is a view of a detail of the control means of FIG. 4 in an alternate operating position.

When the traverse apron assembly comes into contact with actuator roller 106, limit valve 102 is moved to its flow position permitting air to bleed from control valve 80 through line 82 whereupon control valve 80 moves from the FIG. 4 position to the alternate position shown in FIG. 5. This causes air to be exhausted to atmosphere through valves 72 and 80 and static air pressure to be applied to clutch 34 from line 90 through hose assembly 31. Thus, clutch 38 is disengaged and clutch 34 is engaged. The engagement of clutch 34 causes clutch shaft 36 to drive output shaft 14 in the counterclockwise direction as viewed in FIG. 1 whereupon the lapper traverse shaft causes a reversal of the travel of the traverse apron assembly which now travels back toward the actuator roller 104 of limit valve 100.

When the limit valve 100 is subsequently tripped by the traverse apron assembly, the parts will be returned to the operating position shown in FIG. 4 in the manner described above. The reversing transmission of the invention will continue to operate as described above to alternately reverse the direction of rotation of the output shaft 14 by actuating the clutches 34 and 38 between the engaged and disengaged conditions thereof.

What is claimed is:

1. A reversing transmission comprising:
   a rotating transmission input member,
   an output shaft mounted for rotation in either direction about its axis,
   a first clutch means actuatable between an engaged and disengaged position and including a rotatable input drive member,
   a second clutch means actuatable between an engaged and a disengaged position and including a rotatable input drive member,
   drive means operatively connected between said transmission input member and said input drive members of said first and second clutch means for rotating the same,
   first driven means responsive to the actuation of said first clutch means into said engaged position thereof for causing said output shaft to rotate in one direction about its axis,
   second driven means responsive to the actuation of said second clutch means into said engaged position thereof for causing said output shaft to rotate in the other direction about its axis,
   and pneumatic control means continuously and repeatedly responsive to a first operating condition for causing actuation of said first clutch means into its engaged position and said second clutch means into its disengaged position and continuously and repeatedly responsive to a second operating condition for causing actuation of said second clutch means into its engaged position and said first clutch means into its disengaged position,
   said first and second clutch means including pneumatic clutches adapted to be actuated from a disengaged position thereof to an engaged position thereof by the application of air under pressure thereto,
   said control means including a control valve for controlling the flow of air to said first and second pneumatic clutches for controlling operation thereof, said control means including a pressure regulated air supply for supplying air at a desired pressure to said control valve, said control valve comprising a two-position double air bleed pilot valve, said control means including a first pneumatically operated limit valve for sensing said first operating condition and a second pneumatically operated limit valve for sensing said second operating condition, said limit valves being pneumatically connected to said pilot valve for controlling the operation thereof, said limit valves including contact members actuatable between flow and no flow positions in response to the occurrence of said first and second operating conditions, and means for positioning said limit valves at various locations along a path of travel to vary the location at which said first and second operating conditions are sensed.

2. A reversing transmission according to claim 1 wherein said first clutch means includes a rotatable shaft operatively connected to said first driven means and said second clutch means includes a rotatable shaft operatively connected to said second driven means, and wherein said driven means includes a first sprocket mounted on said rotatable shaft of said first clutch means for rotation therewith, a second sprocket mounted on said rotatable shaft of said second clutch means for rotation therewith, a third sprocket mounted on said output shaft in alignment with said first sprocket and means for drivingly engaging said first and third sprockets, and a fourth sprocket mounted on said output shaft in alignment with said second sprocket and means for drivingly engaging said second and fourth sprockets, said first and third sprockets causing rotation of output shaft in one direction and said second and fourth sprockets causing rotation of said output shaft in the other direction.

3. A reversing transmission according to claim 1 including a quick exhaust valve associated with each clutch means for exhausting air therefrom when said clutch means in moved to said disengaged position.

4. A reversing transmission according to claim 2 wherein said output shaft has mounted thereon a variable pitch pulley adjustable to vary the pitch diameter thereof.

* * * * *